United States Patent
Cappellotto

(10) Patent No.: US 11,584,154 B2
(45) Date of Patent: Feb. 21, 2023

(54) NIPPLE FOR SPOKED WHEELS, PARTICULARLY FOR MOTORCYCLES

(71) Applicant: ALPINI RAGGI S.P.A., Lomagna (IT)

(72) Inventor: Guido Cappellotto, Arcore (IT)

(73) Assignee: ALPINA RAGGI S.P.A., Lomagna (IT)

( * ) Notice: Subject to any disclaimer, the term of this patent is extended or adjusted under 35 U.S.C. 154(b) by 151 days.

(21) Appl. No.: 16/624,599

(22) PCT Filed: Jun. 19, 2018

(86) PCT No.: PCT/IB2018/054511
§ 371 (c)(1),
(2) Date: Dec. 19, 2019

(87) PCT Pub. No.: WO2018/234997
PCT Pub. Date: Dec. 27, 2018

(65) Prior Publication Data
US 2020/0108657 A1    Apr. 9, 2020

(30) Foreign Application Priority Data

Jun. 19, 2017    (IT) .......................... 102017000067931

(51) Int. Cl.
*B60B 1/04*    (2006.01)
*B60B 21/06*    (2006.01)

(52) U.S. Cl.
CPC ............ *B60B 1/044* (2013.01); *B60B 21/062* (2013.01)

(58) Field of Classification Search
CPC ......... B60B 1/044; B60B 1/045; B60B 1/046; B60B 1/047; B60B 21/062
See application file for complete search history.

(56) References Cited

U.S. PATENT DOCUMENTS

| 476,433 | A | * | 6/1892 | Vetterlein | ............... | B60B 1/048 301/58 |
| 2,778,690 | A | * | 1/1957 | Horling, Jr. | ............. | B60B 1/045 301/58 |

(Continued)

FOREIGN PATENT DOCUMENTS

| DE | 2223163 A1 | 11/1973 |
| DE | 10002527 A1 | 7/2001 |

(Continued)

OTHER PUBLICATIONS

Written Opinion and International Search Report in PCT/IB2018/054511 dated Dec. 27, 2018.

(Continued)

*Primary Examiner* — S. Joseph Morano
*Assistant Examiner* — Emily G. Castonguay
(74) *Attorney, Agent, or Firm* — Kristina Castellano; Castellano PLLC

(57) ABSTRACT

A nipple for spoked wheels includes a head and a rod which are coaxial and through which a through-hole extends, a manoeuvring key in the head and an insert of plastics material which is inserted in the hole in order to engage in a screwing manner with friction with a threaded end of a spoke. The hole comprises a threaded portion which extends in the rod and a portion with an increased diameter which constitutes the seat for receiving the insert, the insert being formed with a tubular sleeve inserted in the seat at the side of the head and being blocked there by means of interference or adhesive bonding.

8 Claims, 1 Drawing Sheet

(56) References Cited

U.S. PATENT DOCUMENTS

| | | | | |
|---|---|---|---|---|
| 6,557,946 B1 * | 5/2003 | Gerrit | ................... | B60B 1/00 |
| | | | | 29/894.33 |
| 8,162,407 B2 * | 4/2012 | Mercat | ................... | B60B 1/045 |
| | | | | 301/58 |
| 2007/0080577 A1 * | 4/2007 | Fioravanti | ............... | B60B 1/045 |
| | | | | 301/104 |
| 2008/0054710 A1 | 3/2008 | Spahr et al. | | |

FOREIGN PATENT DOCUMENTS

| | | | | |
|---|---|---|---|---|
| EP | 0838352 B1 | 4/1998 | | |
| EP | 1559582 B1 | 8/2005 | | |
| EP | 2525985 B1 | 11/2012 | | |
| FR | 2816245 A1 * | 5/2002 | ........... | B60B 21/062 |

OTHER PUBLICATIONS

International Preliminary Report on Patentability in PCT/IB2018/054511 dated Dec. 24, 2019.

* cited by examiner

NIPPLE FOR SPOKED WHEELS, PARTICULARLY FOR MOTORCYCLES

CROSS REFERENCE TO RELATED APPLICATIONS

This application is a U.S. National Stage application of PCT/IB2018/054511 filed on Jun. 19, 2018, which claims priority to Italian patent application 102017000067931 filed on Jun. 19, 2017, the contents of both of which are incorporated herein by reference.

DESCRIPTION

The invention relates to a nipple for spoked wheels, particularly for wheels intended for the field of motorcycling.

In the field of spooked wheels, there is often encountered the problem of accidental loosening of the nipples as a result of the vibrations and the impacts to which they are continuously subjected during use. The problem is of particular importance in relation to the fact that the loosening of the nipples produces dangerous results with respect to the o stability and reliability of the vehicle, being able to cause the breakage of one or more spokes or at least the overloading thereof, as well as both static and dynamic deformations of the wheel.

In order to fight the accidental loosening of the nipples, there have been developed different technologies which range from the provision of thread-locking liquids between the nipple and the spoke which are screwed thereto to the provision of plastics material inserts which are received in the nipple and which are capable of receiving portions of the threaded member of the spoke with a desired level of friction to prevent the automatic loosening thereof. The invention is included within nipples of this type.

In this field, for example, it is known from EP838352 to provide a plastics material insert which is applied in a suitable seat of the nipple and which is therefore bored at the same time as the boring of the nipple. The result of this operation is a nipple which is highly efficient but the set of processing operations for obtaining it involves different steps for the piece with a resultant increase of the production costs.

EP2678172 describes a method in which the nipple which is constructed with the mechanical processing operations sought is then subjected to injection of plastics material in order to form therein an insert. In this case, several processing steps are also necessary with resultant possible mechanical inaccuracies of the finished piece.

Another example of a nipple is described in EP2525985 in which there is used an insert having a plurality of members of plastics material or EP1559582, the latter being intended only for wheels for bicycles.

The problem addressed by the present invention is to provide a nipple which is particularly though not exclusively intended for motorcycle uses, which is structurally and functionally configured to overcome all the disadvantages set out with reference to the cited prior art.

The invention particularly relates to a nipple for spoked wheels, including a head and a rod which are coaxial and through which a through-hole extends coaxially, with a manoeuvring key in the head of the nipple and an insert of plastics material which is inserted in the hole in order to engage in a screwing manner with friction with a threaded end of a spoke, in order to prevent the accidental loosening thereof, in which the hole comprises a first threaded portion which extends in the rod and a second portion which has an increased diameter with respect to the first portion and which extends between the threaded portion and the counter-sinking. The portion with increased diameter constitutes the seat for receiving the insert, which is formed with a tubular sleeve inserted in the seat thereof at the side of the head which carries the counter-sinking, that is to say, the manoeuvring key, and is blocked there by means of interference or adhesive bonding.

The metal structure of this nipple is suitable for very accurate processing operations because it can be produced by processing the nipple from both ends thereof. As a result of the low tolerances thereby obtained, it is possible to construct the nipple with high-strength steels, which are particularly suitable for the performance levels required in the field of motorcycles, such as steels with resistance classes greater than 6 and preferably between 8 and 10 according to the standard EN ISO 898-1.

The characteristics and advantages of the nipple according to the invention will be better appreciated from the following detailed description of a preferred though non-limiting embodiment thereof which is illustrated by way of non-limiting example with reference to the appended drawings, in which.

Figure 1:
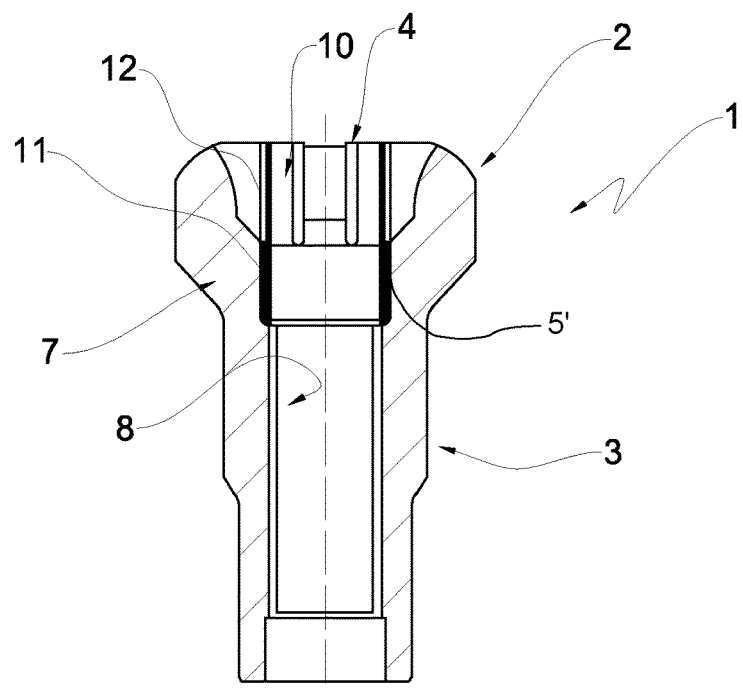
FIG. 1 is a cross-section of the nipple of this invention.
Figure 2:
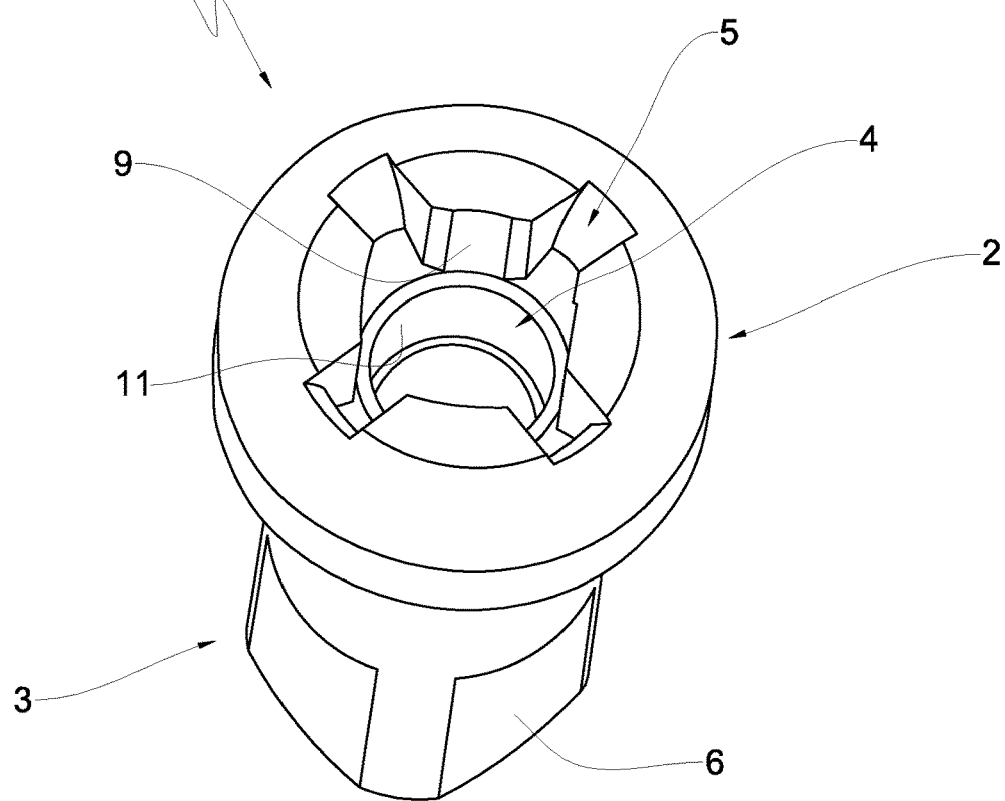
FIG. 2 is a perspective view from the side of the head of the same nipple.

In FIG. 1, there is generally designated 1 a nipple for spoked wheels which is particularly though not exclusively intended for wheels for motorcycles, preferably of the medium-to-heavy duty type, including a head 2 and a rod 3 which are both generally cylindrical and coaxial. A through-hole 4 extends axially through the head and rod and both preferably have a respective manoeuvring key 5, 6. Alternatively, only the head may have the manoeuvring key.

Preferably, the manoeuvring key on the rod is constructed by a polygonal profile which is formed externally on the portion of the rod 3 which is distal with respect to the head.

In one embodiment, the manoeuvring key on the head 5 is constructed by a counter-sinking 9 which is recessed in the head, at the distal side with respect to the rod and preferably shaped for TORX® (star) or QUADRIX™ (quad) keys.

The head 2 is widened with respect to the diameter of the rod and is connected thereto by means of a frustoconical collet 7.

In some embodiments, the hole 4 for the portion formed in the rod 3 is threaded with a thread 8 which is intended to receive in a screwing manner the threaded end portion of a spoke (not illustrated).

Preferably, the thread 8 extends between an opening of the hole 4 and a section corresponding to the lower base of the collet 7. There is formed between the lower base of the collet 7 and the base of the counter-sinking 9 a portion 12 of increased diameter which defines a seat 10 with an increased diameter with respect to the diameter of the hole 4.

An insert 11 is received and rotationally fixed in the seat 10. The insert 11 is formed with a tubular sleeve and it is preferably produced from plastics material. The outer diameter of tubular sleeve engages in the seat 10, while the inner diameter is such that it engages in a screwing manner with friction with the threaded end of a spoke when it is engaged in the hole of the nipple 1. The insert 11 is inserted in the seat 10 at the side of the manoeuvring key.

In some embodiments, the insert 11 is received with slight interference, optionally helped by adhesive bonding.

Preferably, the manoeuvring key 5 defines a base 5', in correspondence of which e.g. there abuts the tool used to act on the key when it is urged in an axial direction on the manoeuvring key itself.

According to a preferred embodiment, the insert 11 is arranged in an axially more remote position with respect to the top of the head than the spoke with respect to the base 5' of the manoeuvring key.

In this manner, the use of the tool is not impeded by the presence of the insert.

More generally, this can be brought about by arranging the insert 11 in a position under the manoeuvring key with respect to the head 2 of the nipple.

The rod and head of the nipple 1 are produced from alloy steel having a resistance class greater than 6 and preferably between 8 and 10 according to EN ISO 898-1.

The invention thereby solves the problem set out and achieves a number of advantages, including better blocking to prevent accidental unscrewing on the spoke, a low weight and a great strength which ensure a more effective operation of the spoked wheel which is thereby also provided under tough conditions such as those which are generally found in heavy-duty motorcycles.

The invention claimed is:

1. A nipple for spoked wheels, including a head and a rod which are coaxial and through which a through-hole extends coaxially, a manoeuvring key formed by a recess in the head and an insert of plastics material which is inserted in the hole in order to engage in a screwing manner with friction with a threaded end of a spoke, wherein the hole comprises a threaded portion which extends in the rod and a portion with an increased diameter between the threaded portion and the manoeuvring key, the portion with increased diameter which constitutes the seat for receiving the insert, the insert being formed with a tubular sleeve inserted in the seat at the side of the head and being blocked there by means of interference or adhesive bonding, wherein the recess in the head of the nipple forming the manoeuvring key includes a base which is intended to abut a tool which is configured to act with the manoeuvring key, the insert being arranged in a position which is axially more remote with respect to a top surface of the head than the base so as to prevent contact between the tool and the insert when the tool is inserted in the recess.

2. The nipple for spoked wheels according to claim 1, wherein the manoeuvring key is constructed in the form of a countersinking which is recessed in the head.

3. The nipple for spoked wheels according to claim 2, wherein the countersinking is of the type with a star or quad key.

4. The nipple for spoked wheels according to claim 1, wherein the seat is constructed from a section of the nipple corresponding to the base of a connection collet between the head and the rod.

5. The nipple for spoked wheels according to claim 2, wherein the seat extends in the nipple as far as the base of the countersinking.

6. The nipple for spoked wheels according to claim 1, wherein the nipple is produced from alloy steel having a resistance class greater than 6.

7. The nipple for spoked wheels according to claim 6, wherein the nipple is produced from alloy steel having a resistance class between 8 and 10.

8. The nipple for spoked wheels according to claim 1, wherein said nipple is suitable for motorcycling uses.

\* \* \* \* \*